United States Patent
Nitta et al.

[11] Patent Number: 5,381,275
[45] Date of Patent: Jan. 10, 1995

[54] APPARATUS AND METHOD FOR RECORDING DIGITAL DATA WITH A CONTROLLED DATA COMPRESSION RATIO

[75] Inventors: Hajime Nitta, Kanagawa; Masatoshi Takashima, Tokyo; Takehiko Saito, Chiba; Tomihiro Nakagawa, Kanagawa; Keitaro Yamashita, Tokyo, all of Japan

[73] Assignee: Sony Corporation, Tokyo, Japan

[21] Appl. No.: 102,841

[22] Filed: Aug. 6, 1993

[30] Foreign Application Priority Data

Aug. 28, 1992 [JP] Japan ................... 4-254063

[51] Int. Cl.⁶ .................. G11B 5/09; H04N 5/76
[52] U.S. Cl. ....................... 360/48; 358/335
[58] Field of Search .............. 360/8, 9.1, 32, 48; 358/342, 343, 335, 906, 909

[56] References Cited

U.S. PATENT DOCUMENTS

| 5,032,927 | 7/1991 | Watanabe et al. | 358/343 |
| 5,079,630 | 1/1992 | Golin et al. | 358/133 |
| 5,237,460 | 8/1993 | Miller et al. | 360/48 |

FOREIGN PATENT DOCUMENTS 0406189 1/1991 European Pat. Off. .

OTHER PUBLICATIONS

Patent Abstracts of Japan vol. 013, No. 108 (P-843) 15 Mar. 1989 & JP-A-63 285 769 (Canon Inc.) 22 Nov. 1988.
Database WPI Section EI, Week 8824, Derwent Publications Ltd., London, GB; Class W04, AN 88-165272 & JP-A-63 104 259 (Fuji Photo Film K.K.) 9 May 1988.

Primary Examiner—Donald Hajec
Assistant Examiner—Won Tae C. Kim
Attorney, Agent, or Firm—William S. Frommer; Alvin Sinderbrand

[57] ABSTRACT

In step S1, the capacity of the area (remaining quantity) of a disk in which information can be recorded is read, and the remaining quantity is displayed in step S2. After a user inputs the recording time of information to be recorded and the recording capacity w for the recording, an average transmission rate $R_1$ is calculated from expression $R_1 = w/t - \alpha$ in step S4. The rate $\alpha$ is the transmission rate for transmitting signals other than a video signal, such as an audio signal, attached to the video signal. Data obtained by applying a DCT treatment to the video data is quantized with a quantization width corresponding to the average transmission rate $R_1$ and this data is intermittently recorded on the disk.

6 Claims, 14 Drawing Sheets

HORIZONTAL FREQ. →

VERTICAL FREQ. ↓

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

CHANGES IN QUANTIZATION WIDTH $R_1 - R_2$

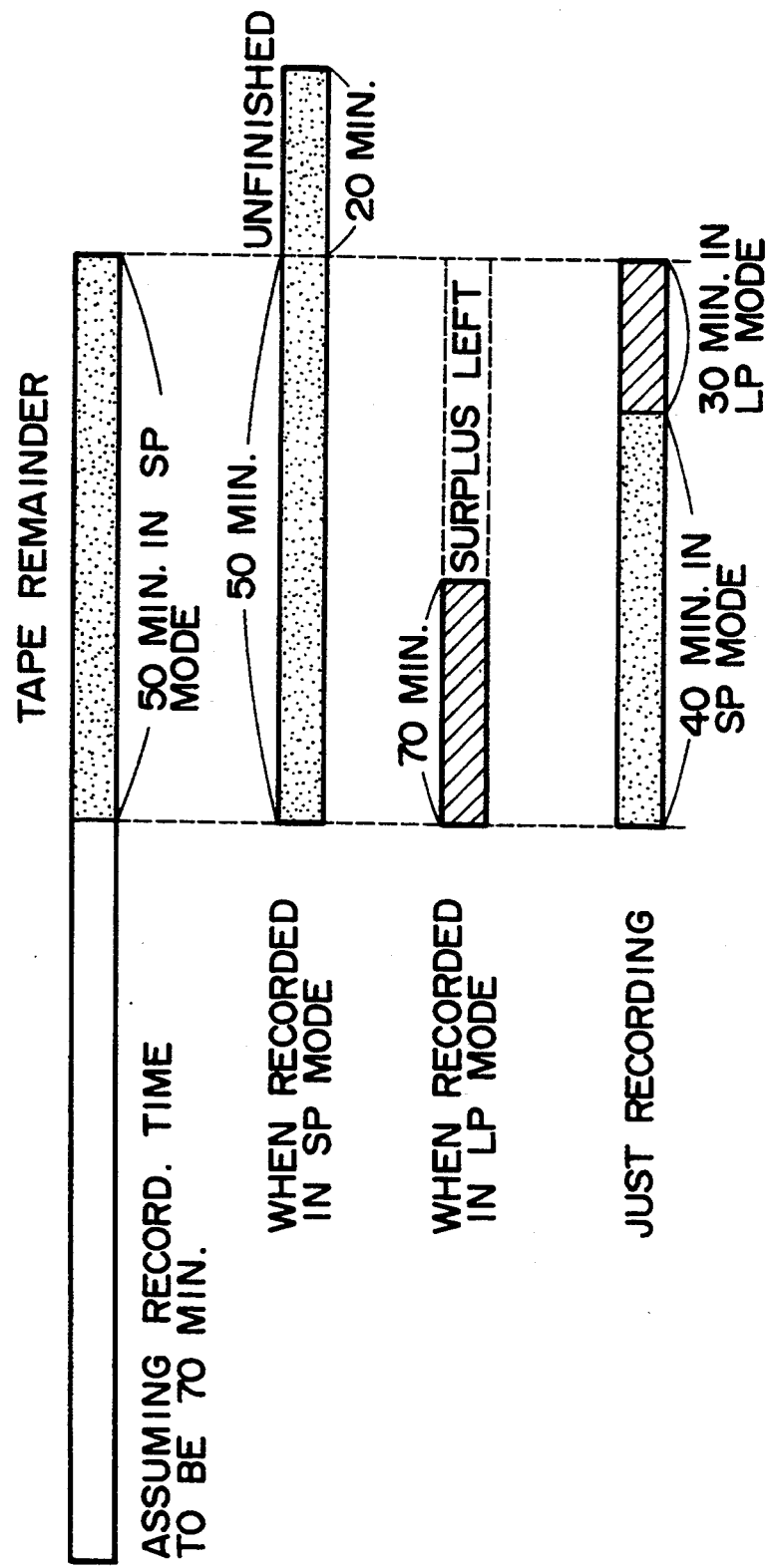

APPARATUS AND METHOD FOR RECORDING DIGITAL DATA WITH A CONTROLLED DATA COMPRESSION RATIO

BACKGROUND OF THE INVENTION

1. Field of the Invention

The present invention relates to an apparatus and a method for recording digital data suitable for use in digital recording, for example, a video signal on a recording medium such as a magnetic disk.

2. Description of the Related Art

There are video tape recorders which have a just recording function. When a video signal is recorded using the "just" recording function, the video signal can be recorded on a magnetic tape neither excessively nor deficiently.

More specifically, it is assumed for example that the first half of a magnetic tape has already been used for recording a specific video signal and the remaining portion of the tape is capable of recording thereon a video signal for a period of 50 minutes if the signal is recorded in the SP mode as shown in FIG. 18. Then, if a movie running 70 minutes is recorded on this tape in the SP mode, the 70 minute movie can be recorded only up to its 50-minute portion and the remaining 20-minute portion cannot be recorded.

On the other hand, if the movie is recorded in the LP mode (triple-play mode), it becomes possible to record the movie for 70 minutes but, in this case, there remains some portion of the tape where no video signal is recorded.

In such case, if the movie is recorded using the "just" recording function, for example its beginning 40-minute portion can be recorded in the SP mode and the remaining 30-minute portion can be recorded in the LP mode. As a result, the video signal can be recorded in the remaining portion of the magnetic tape neither excessively nor deficiently.

In the case of the above described video tape recorder, there arises a problem that, while the beginning 40-minute portion of the total video signal lasting 70 minutes can provide good and pleasant picture quality because it is recorded in the SP mode, the remaining 30-minute portion is deteriorated in picture quality because it is recorded in the LP mode.

SUMMARY OF THE INVENTION

The present invention was made in view of the above described situation. Accordingly, it is an object of the present invention to make it possible to record a certain length of information in a recordable area of a recording medium neither excessively nor deficiently and with highest possible picture quality.

The digital data recording apparatus according to the present invention is characterized in that it comprises an input portion 13 for acquiring a capacity of a disk 15 as a recording medium in which information can be recorded and the length of information to be recorded, a coder 1 as compression means for compressing data obtained by digitizing information to be recorded, a compression ratio control circuit 11 as compression ratio control means for controlling the data compression ratio of the coder 1 in accordance with the output of the input portion 13, and a buffer 8 as recording means for recording the digital data compressed by the coder 1 in the disk 15.

The buffer 8 can be adapted to record digital data in a magnetic tape 53 as a recording medium continuously and at a constant transmission rate.

The digital data recording method according to the present invention is characterized in that it comprises the steps of acquiring a capacity of a disk 15 as a recording medium in which information can be recorded and the length of information to be recorded, compressing data obtained by digitizing information to be recorded, controlling the compression ratio of data in accordance with the acquired capacity and length, and recording the compressed digital data on the disk 15.

The digital data can be recorded in a magnetic tape 53 as a recording medium continuously and at a constant transmission rate.

In the digital data recording apparatus and recording method with the above described arrangement, the compression ratio of data is controlled in accordance with the recording capacity of the disk 15 or magnetic tape 53 and the length of information to be recorded. Accordingly it is made possible to record information with highest possible picture quality and neither excessively nor deficiently.

BRIEF DESCRIPTION OF THE DRAWINGS

FIG. 18 is a diagram explanatory of the "just" recording function.

DESCRIPTION OF THE PREFERRED EMBODIMENTS

Figure 1:
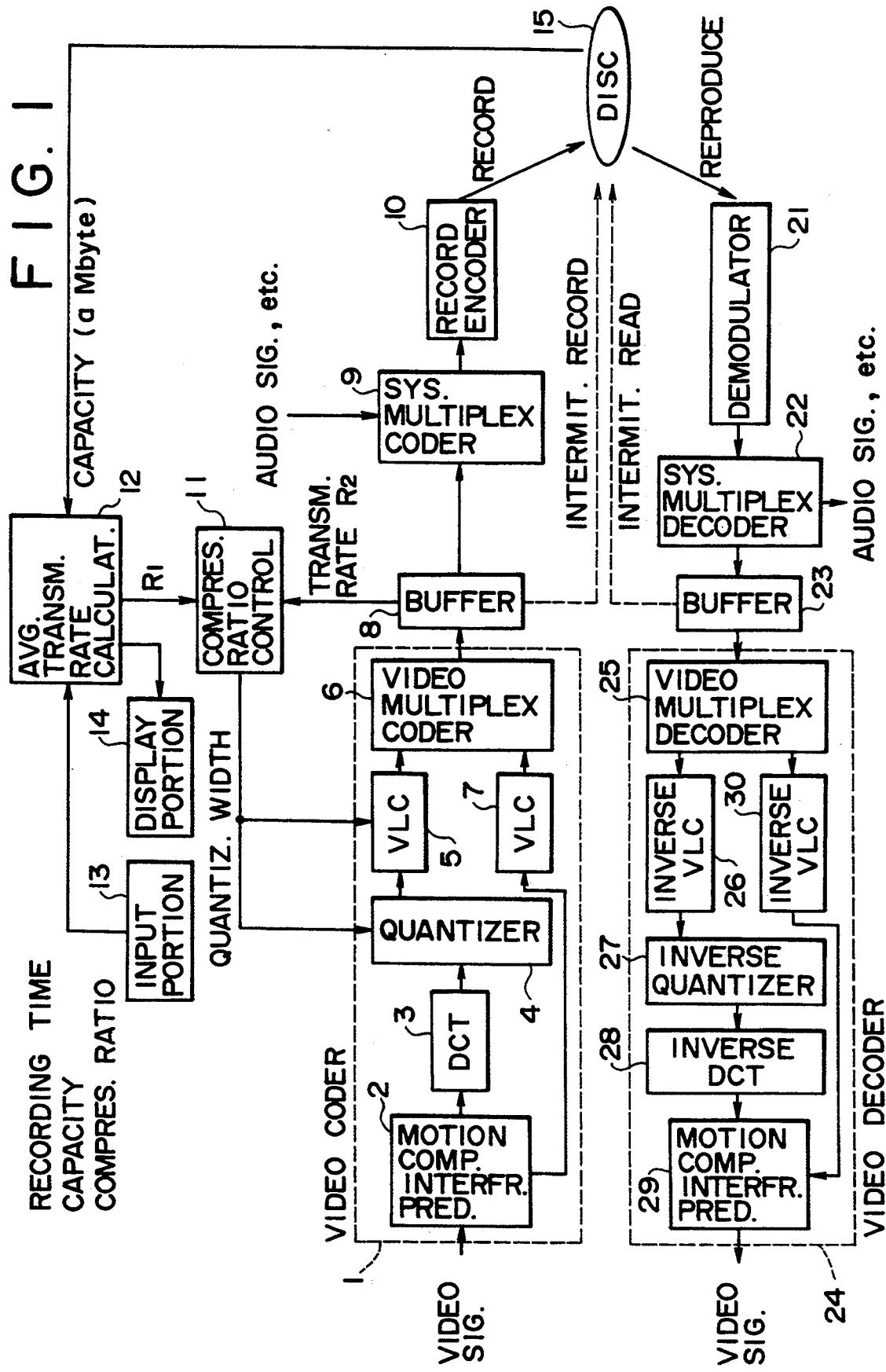
FIG. 1 is a block diagram showing the structure of an embodiment of a disk recording/reproducing apparatus with a digital data recording apparatus of the present invention applied thereto.

FIG. 1 is a block diagram illustrating an embodiment of a disk recording/reproducing apparatus with the digital data recording apparatus of the present invention applied thereto. A motion compensated interframe prediction circuit 2 in a coder 1 is supplied with a video signal. The motion compensated interframe prediction circuit 2 performs motion compensation for the input video signal and supplies a motion vector to a VLC circuit (variable length coding circuit) 7 and outputs pixel data to a DCT circuit (discrete cosine transform circuit) 3. The DCT circuit 3 applies a DCT treatment to the input data and outputs the treated data to a quantization circuit 4. The quantization circuit 4 quantizes the input data and outputs the quantized data to a VLC circuit 5. The data is encoded by the VLC circuit 5 produce to a variable length code which is supplied to a video multiplex coder 6. The data of the motion vector encoded to a variable length code by the VLC circuit 7 is also supplied to the video multiplex coder 6 and, therein, multiplexed with the pixel data component supplied from the VLC circuit 5.

Data output from the video multiplex coder 6 is supplied to a buffer 8 in which a predetermined quantity of data is stored. Data output from the buffer 8 is supplied to a system multiplex coder 9 wherein the data is multiplexed with an audio signal and other additional data to be supplied to a record coding circuit 10. Therein, the multiplexed data is encoded to a record code in a predetermined format to be supplied to a disk 15 and recorded thereon. Further, the buffer 8 supplies the transmission rate $R_2$ of the data supplied from the video multiplex coder 6 to a compression ratio control circuit 11. An average transmission rate calculation circuit 12 detects the capacity (remaining quantity of the area in which data can be recorded) of the disk 15. The average transmission rate calculation circuit 12 is adapted to be supplied with the recording time of information to be recorded in the disk 15, the capacity of the area used for recording the information therein, and the picture quality (compression ratio) in the recording of the video signal from an input portion 13. The average transmission rate calculation circuit 12 calculates an average transmission rate $R_1$ from these inputs and supplies it to the compression ratio control circuit 11.

The compression ratio control circuit 11 calculates the quantization width from the average transmission rate $R_1$ supplied from the average transmission rate calculation circuit 12 and the transmission rate $R_2$ supplied from the buffer 8 and outputs the value of the quantization width to the quantization circuit 4 and the VLC circuit 5.

A reproduced signal from the disk 15 is adapted to be demodulated by a demodulation circuit 21 and supplied to a system multiplex decoder 22. The system multiplex decoder 22 separates the input signal into a video signal component and an audio signal component and outputs the audio signal component to a circuit, not shown, and the video signal component to a buffer 23 so as to be stored therein.

The video signal component read from the buffer 23 is supplied to a video multiplex decoder 25 of a decoder 24 and separated into a pixel data component and a motion vector component. The pixel data component is supplied to an inverse VLC circuit 26 to be subjected to an inverse VLC treatment and then supplied to an inverse quantization circuit 27. The data undergone an inverse quantization treatment in the inverse quantization circuit 27 is supplied to an inverse DCT circuit 28 to be subjected to an inverse DCT treatment. The output of the inverse DCT circuit 28 is supplied to a motion compensated interframe prediction circuit 29.

To the motion compensated interframe prediction circuit 29, the motion vector component subjected to an inverse VLC treatment in an inverse VLC circuit 30 is also supplied. The motion compensated interframe prediction circuit 29, in accordance with the motion vector, compensates the pixel data supplied from the inverse VLC circuit 28 for motion and supplies the data to a circuit, not shown.

Figure 2:
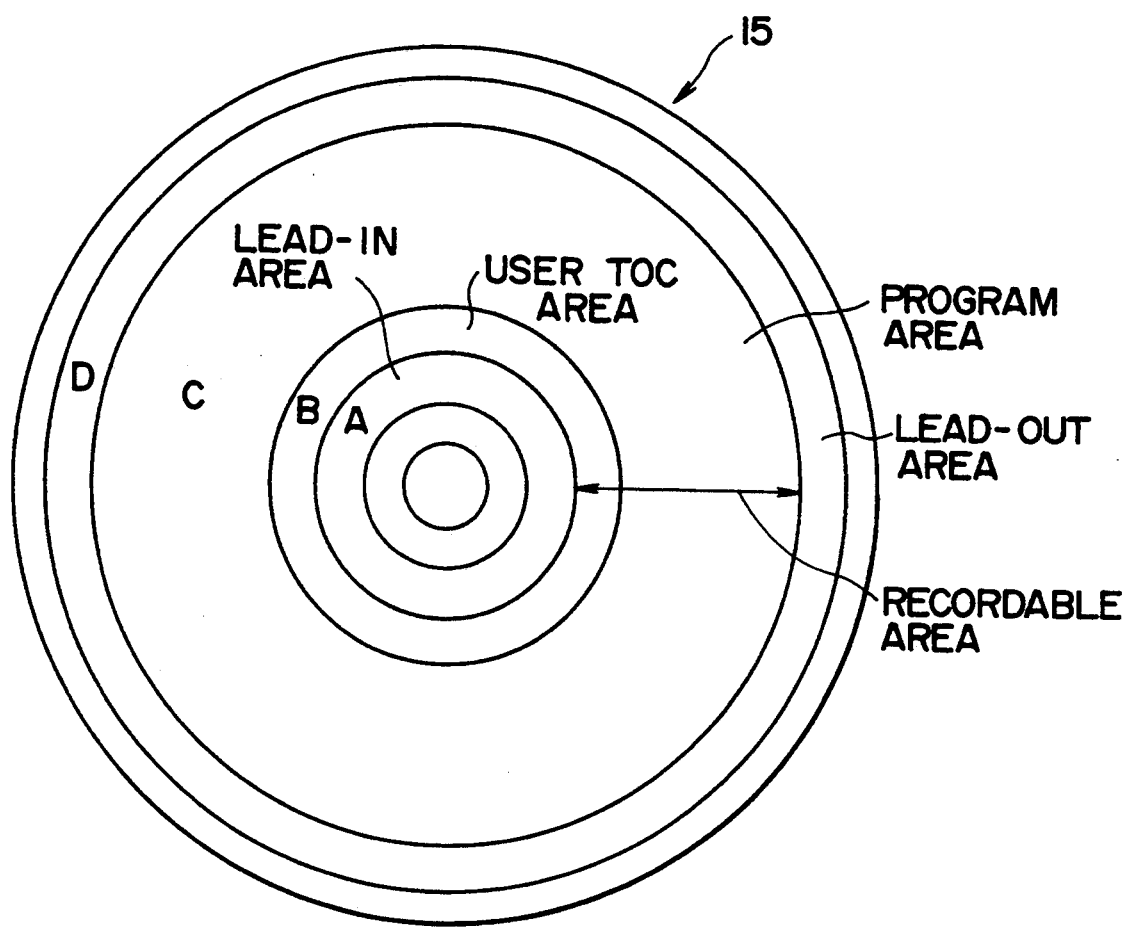
FIG. 2 is a diagram explanatory of a format of the disk 15 in FIG. 1.

FIG. 2 is a diagram showing a format of the disk 15. As shown therein, the TOC (Table of Contents) of the disk is recorded in the innermost lead-in area A of the disk 15. In a user TOC area B, on the outer side of the lead-in area A, TOC data desired by the user is adapted to be recorded according to the need.

On the outer side of the user TOC area B, there is provided a program area C. When for example video signals of a plurality of movies are recorded in the program area C, the data of the positions of the heads of the movies is recorded in the user TOC area B. On the outer side of the program area C, there is formed a lead-out area D. The areas in which the user can record data are the user TOC area B and the program area C.

Referring to a flow chart of FIG. 3, operation of the average transmission rate calculation circuit 12 will be described below. When the user issues a command to start recording by operating the input portion 13, the average transmission rate calculation circuit 12, first in step S1, reads the remaining quantity (recording capacity) of the disk 15. More specifically, the average transmission rate calculation circuit 12 reads the total capacity (the capacity of the program area C) of the disk 15 from the TOC data recorded in the lead-in area A. Then, it accesses the user TOC area B and calculates, from the TOC data recorded therein, the total quantity of the data already recorded in the program area C. Then, it subtracts the data quantity already recorded in the program area C from the capacity of the program area C read from the TOC data in the lead-in area A and thereby obtains the recording capacity (remaining quantity) at that point of time.

The remaining quantity thus calculated is displayed on a display portion 14 in step S2. The user is enabled to know the recording capacity of the disk 15 by looking at the display of the remaining quantity. Then, in step S3, the user inputs the record capacity w of the information to be recorded, within the range of the remaining quantity displayed on the display portion 14, and the recording time t of the information by operating the input portion 13.

Then, in step S4, the average transmission rate calculation circuit 12 calculates the average transmission rate $R_1$ from the following expression:

$$R_1 = w/t - \alpha$$

where $\alpha$ is the transmission rate of the audio data and other additional data to be added to the video data in the system multiplex coder 9.

In the following step S5, the average transmission rate calculation circuit 12 causes the display portion 14 to display the picture quality of the video signal when recorded at the average transmission rate $R_1$ calculated in step S4. For this picture quality displaying, the average transmission rate calculation circuit 12 calculates a picture from the video data previously stored in a memory incorporated therein at the average transmission rate $R_1$ calculated in step S4 and displays the picture obtained by the calculation on the display portion 14. The user is enabled to evaluate the picture which will be obtained when the data is recorded and reproduced with the conditions input in step S3.

Then, in step S6, the user judges, upon looking at the picture displayed on the display portion 14 in step S5, whether or not the quality of the picture is satisfactory. When the quality of the picture displayed on the display portion 14 is not satisfactory, the user inputs his disapproval by operating the input portion 13. Then, the flow returns from step S6 to step S3 and, therein, the input process of the record capacity w and the recording time t is performed anew.

When it is decided in step S6 that the quality of the picture displayed on the display portion 14 is satisfactory, the user input his approval by operating the input portion 13. At this point of time, the average transmission rate calculation circuit 12 brings the average transmission rate calculation process to an end.

If the average transmission rate $R_1$ is set up in the described manner, the recording operation on the disk 15 can be performed at the average transmission rate as described later. As a result, it becomes possible to record for example programs a to g in the program area C of a disk 15 as shown in FIG. 4, each at a predetermined rate.

Figure 4:
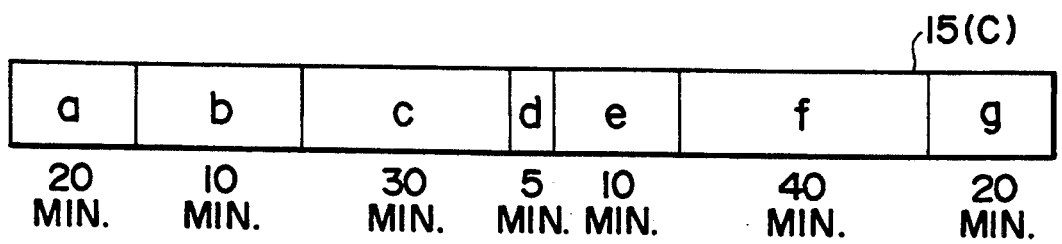
FIG. 4 is a diagram explanatory of a state of the disk 15 in FIG. 1 having programs recorded thereon.

Since the average transmission rates $R_1$ are different (they may, of course, be the same) with programs, the lengths of the 20-minute program a and the 10-minute program b on the disk 15 are, as shown in FIG. 4, not always proportional to the times of recording. In the present case, the length of the 10-minute program b on the disk 15 is greater than the length of the 20-minute program a on the disk 15. This is because the average transmission rate $R_1$ of the program a was set to be greater than the average transmission rate $R_1$ of the program b.

Figure 5A:
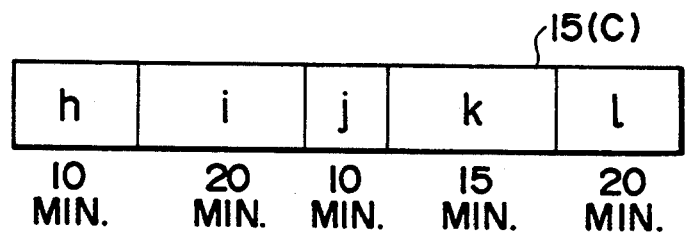
FIGS. 5(a) and 5(b) are diagrams explanatory of a state of the disk 15 in FIG. 1 having a specific program thereon rewritten.
Figure 5B:
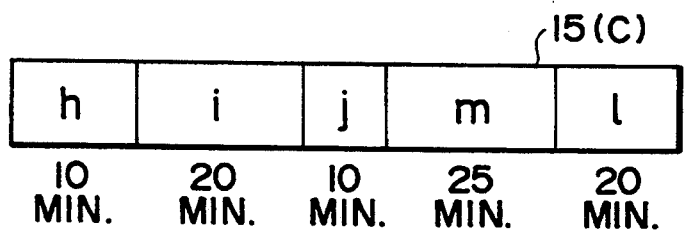

Since the average transmission rate $R_1$ can be set up for each program, in the case where, for example, programs h to i are already recorded as shown in FIG. 5(a), the program k therein can only be rewritten to a program m as shown in FIG. 5(b). In this case, the length of the program m (25 minutes in this example) needs not necessarily be the same as the length of the program k (15 minutes in this example). The program m can be recorded neither excessively nor deficiently in the area where the program k was recorded such that highest possible picture quality is obtained.

Figure 6:
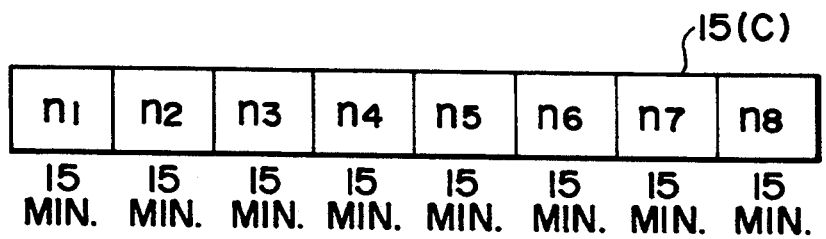
FIG. 6 is a diagram explanatory of a state of the disk 15 in FIG. 1 having installments of a serial program recorded thereon.

Further, as shown in FIG. 6, all of the installments of a serial program can be recorded neither excessively nor deficiently in one disk 15 such that highest possible picture quality is obtained. The example shown in FIG. 6 is such that eight installments n1 to n8 of a serial program are collectively recorded in one disk.

Figure 3:
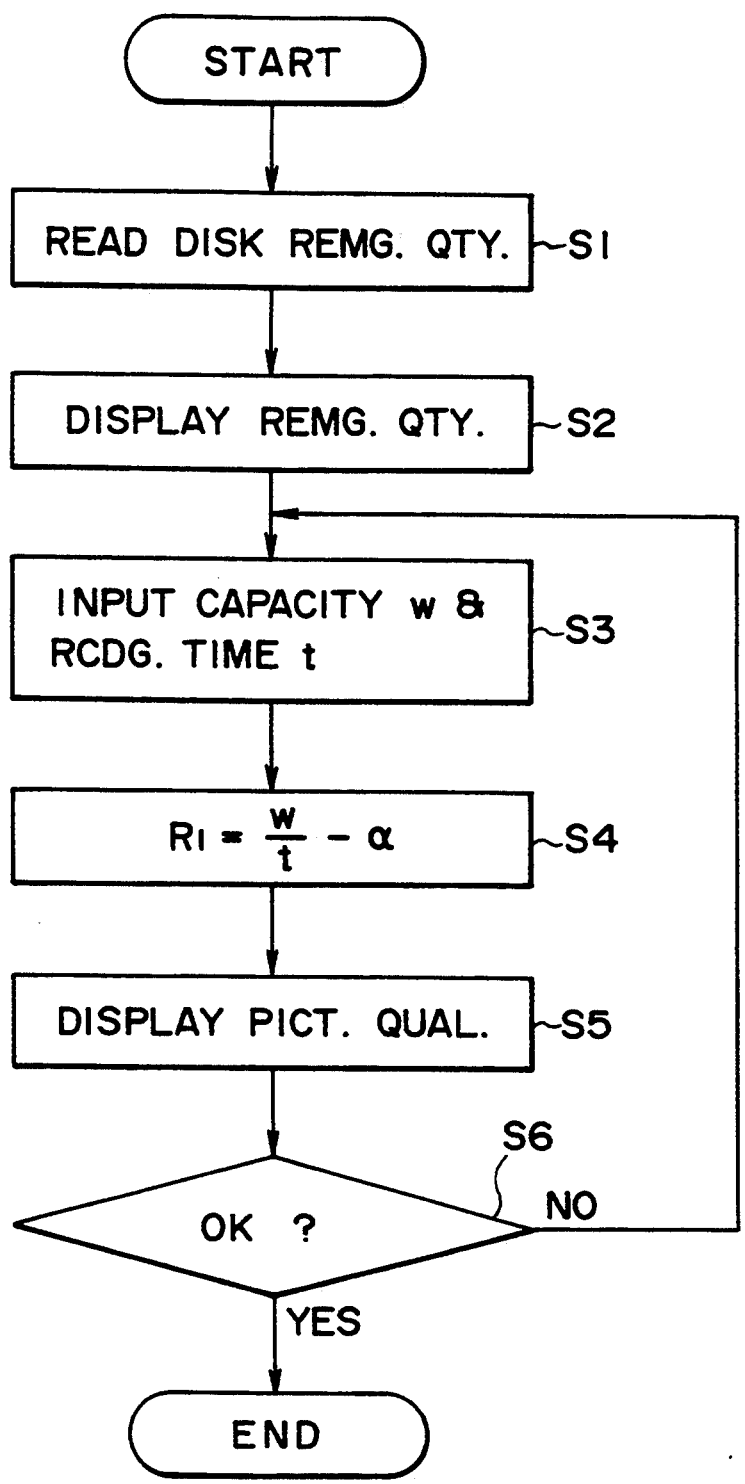
FIG. 3 is a flow chart explanatory of operations in the average transmission rate calculation circuit 12 in FIG. 1.
Figure 7:
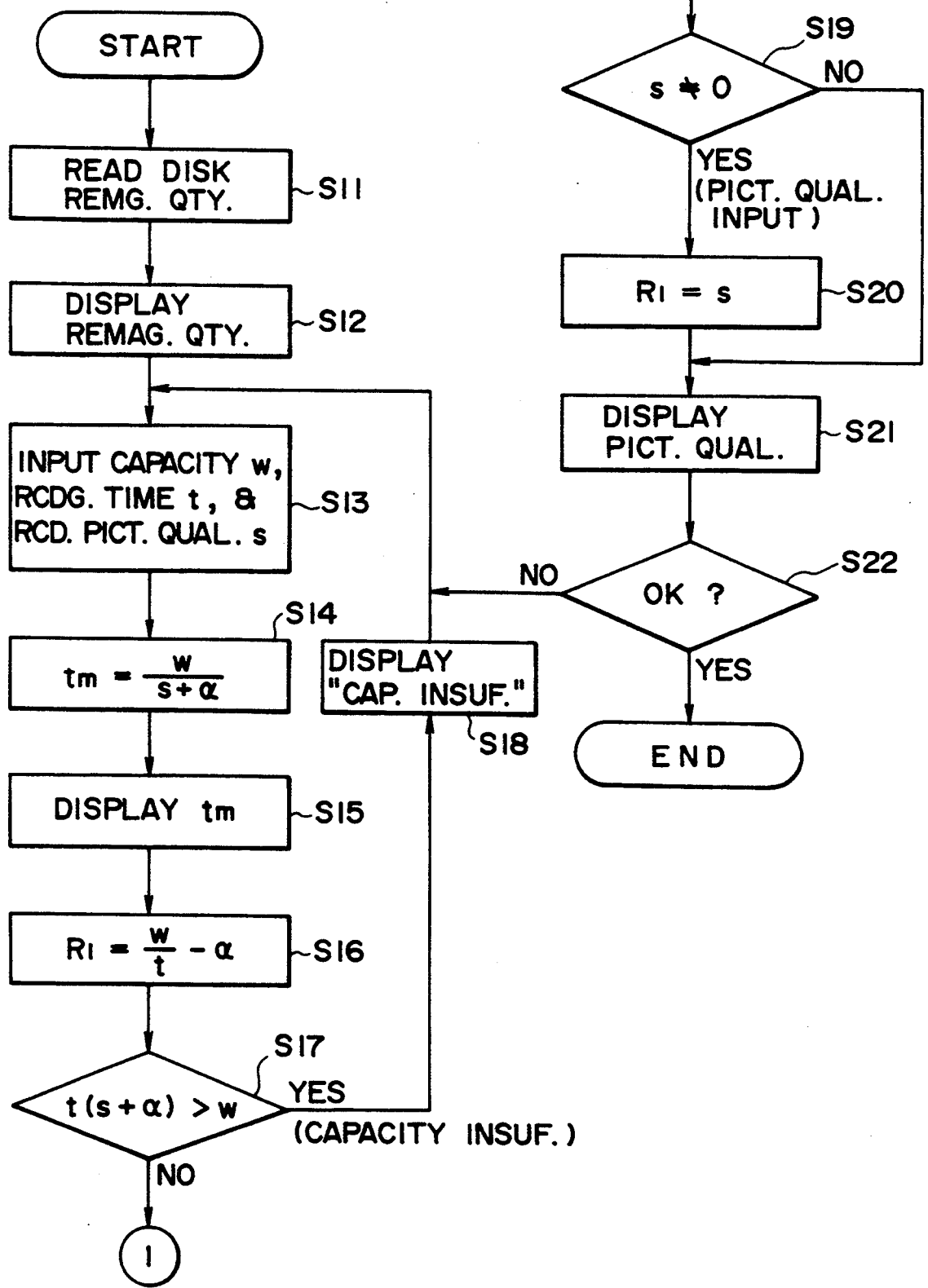
FIG. 7 is a flow chart explanatory of another example of operations in the average transmission rate calculation circuit 12 in FIG. 1.

Although it has been arranged in the case of FIG. 3 such that the record capacity w and the recording time t are input from the input portion 13, it can further be arranged such that the recorded picture quality s (expressed in terms for example of a predetermined transmission rate) can be input. In such case, the average transmission rate $R_1$ may for example be calculated as shown in FIG. 7.

First, in step S11, the remaining quantity is read from the disk 15 and the read quantity is displayed in step S12 on the display portion 14. These processes are the same as those in steps S1 and S2 in FIG. 3.

Then, in step S13, the user inputs the record capacity w, recording time t, and the recorded picture quality s by operating the input portion 13. In the following step S14, the average transmission rate calculation circuit 12 calculates the maximum recording time $t_m$ of the disk 15 at this point of time from the following expression:

$$t_m = w/(s+\alpha)$$

The calculated maximum recording time $t_m$ is displayed on the display portion 14 in step S15. Namely, the user is enabled, by inputting the recorded picture quality s in step S13, to know the maximum recording time period during which the video signal can be recorded on the disk 15 with the input recorded picture quality.

Further, in the following step S16, the average transmission rate $R_1$ is calculated from the following expression:

$$R_1 = w/t - \alpha$$

In the following step S17, it is decided whether or not the recording is possible with the conditions input in step S13. More specifically, when the recording time t and the recorded picture quality s are set up, the capacity of the disk required for recording the video signal with the conditions of the recording time t and the recorded picture quality s becomes $t(s+\alpha)$. If this $t(s+\alpha)$ is greater than the record capacity w, it is impossible to record the video signal whose recording time is t in the record capacity w with the condition of the recorded picture quality being s. Hence, in this case, the display portion 14 is caused to display that the capacity is insufficient in the following step S18. Then, the flow is returned to step S13, wherein the user is caused to input data anew.

Also when the record capacity w is greater than the remaining quantity obtained in step S11, there is produced a shortage in the recording capacity. Accordingly, the average transmission rate calculation circuit 12 makes the relative comparison in step S17, and when there is a shortage in the capacity, the shortage in the capacity is similarly displayed in step S18.

When it is decided in step S17 that there is no shortage in the capacity, then in the following step S19, it is decided whether or not the recorded picture quality s is input. When the recorded picture quality s is input, in the following step S20, the recorded picture quality s is set up as the average transmission rate $R_1$ instead of the result obtained through the calculation performed in step S16. When the recorded picture quality s is not input, the process in step S20 is skipped. Hence, the result obtained by the calculation in step S16 as it is is used as the average transmission rate $R_1$.

In the following step S21, the picture corresponding to the average transmission rate $R_1$ set up in step S16 or S20 is displayed on the display portion 14. When, in the following step S22, the user looks at the picture and finds it unsatisfactory, the user inputs his disapproval by operating the input portion 13. Then, the flow returns to step S13, wherein the user inputs data anew. When the user is satisfied with the displayed picture quality, he inputs his approval by operating the input portion 13, and thus the process for setting up the average transmission rate $R_1$ is ended.

Figure 8:
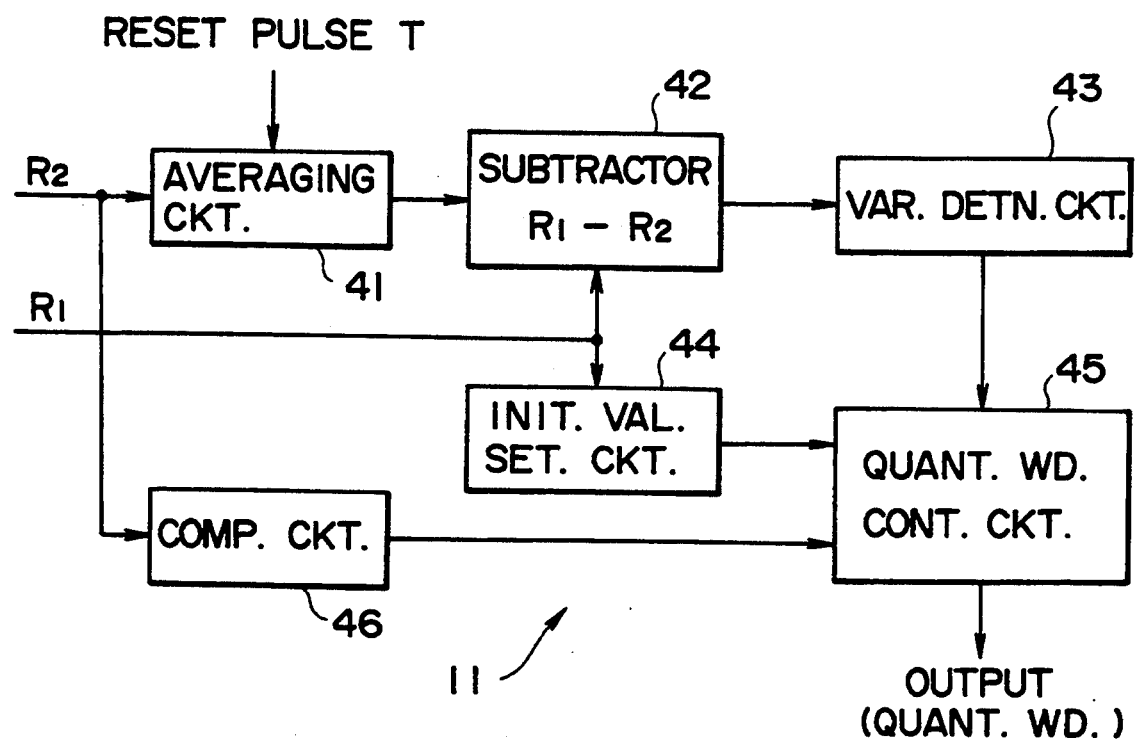
FIG. 8 is a block diagram showing an example of the structure of the compression ratio control circuit 11 in FIG. 1.

The compression ratio control circuit 11 is constructed for example as shown in FIG. 8. In this example, the average transmission rate $R_1$ output from the average transmission rate calculation circuit 12 is supplied to a subtractor 42 and an initial value setting circuit 44. Meanwhile, the transmission rate $R_2$ output from the buffer 8 is supplied to an averaging circuit 41 and a comparison circuit 46. The averaging circuit 41 averages the transmission rate $R_2$ for the period of a reset pulse generated by the average transmission rate calculation circuit 12 and outputs the average value to the subtractor 42.

The subtractor 42 subtracts this average value of the transmission rate $R_2$ from the average transmission rate $R_1$ supplied from the average transmission rate calculation circuit 12 and supplies the difference to a variance determination circuit 43. The variance determination circuit 43 determines a variance corresponding to the input from the subtractor 42 and outputs the variance to a quantization width control circuit 45. The quantization width control circuit 45 is also supplied with the initial value output from the initial value setting circuit 44.

The comparison circuit 46 makes a comparison as to whether or not the transmission rate $R_2$ is greater than the maximum transmission rate determined according to the write speed on the disk 15 and outputs the result of comparison to the quantization width control circuit 45. The quantization width control circuit 45 controls the initial value input from the initial value setting circuit 44 with the variance supplied from the variance determination circuit 43 and outputs the controlled value as the quantization width to the quantization circuit 4 and the VLC circuit 5.

Figure 9:
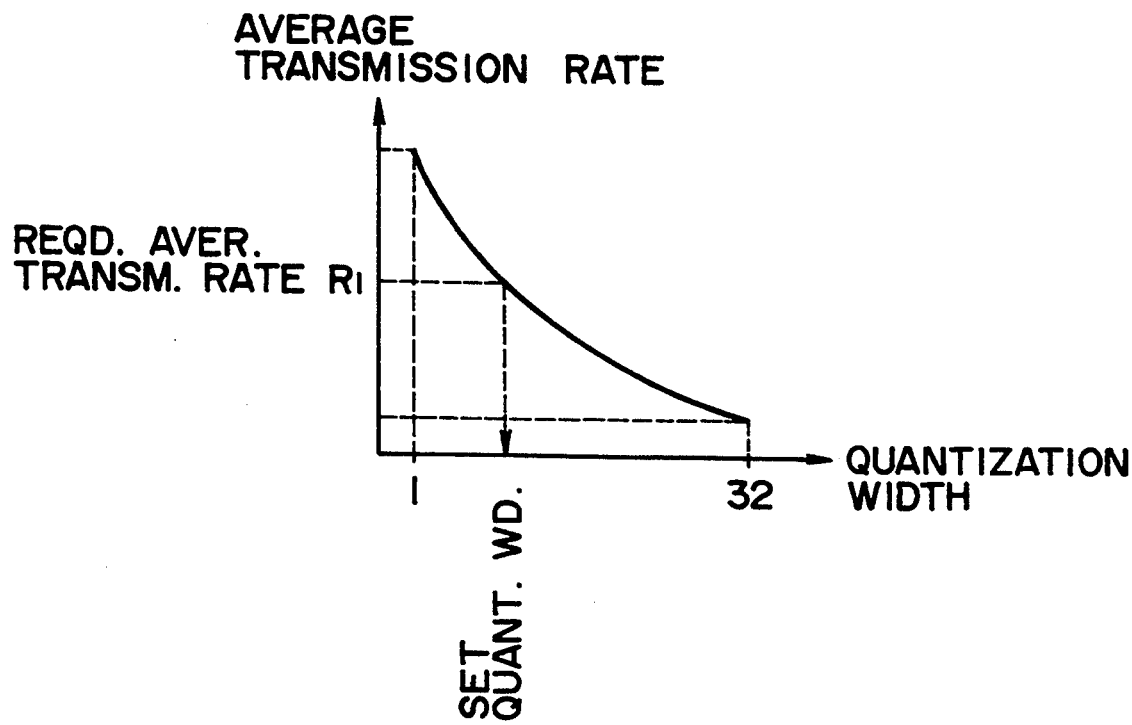
FIG. 9 is a diagram explanatory of input/output characteristics of the initial value setting circuit 44 in FIG. 8.

More specifically, the initial value setting circuit 44 upon receipt of the average transmission rate $R_1$ from the average transmission rate calculation circuit 12 determines the quantization width corresponding to the initial value as shown in FIG. 9. The initial value is set up in inverse proportion to the average transmission rate $R_1$ (the smaller the average transmission rate $R_1$, the greater the quantization width becomes; the greater the average transmission rate $R_1$, the smaller the quantization width becomes). This means that the picture quality becomes worse the greater the quantization width becomes and the picture quality becomes better the smaller the quantization width becomes.

The quantization width control circuit 45 outputs the quantization width corresponding to the initial value thus set up by the initial value setting circuit 44 to the quantization circuit 4 and the VLC circuit 5.

The quantization circuit 4 is supplied with data motion-compensated by the motion compensated interframe prediction circuit 2 and DCT-treated by the DCT circuit 3 (DCT coefficient). The quantization circuit 4 quantizes the DCT coefficient according to the values stored in a reference quantization table shown in FIG. 10 and the quantization width supplied from the compression ratio control circuit 11. The transmission rate obtained by the quantization can be expressed as:

transmission rate = DCT coefficient/(value in the reference quantization table × quantization width)

Figures 10, 11:
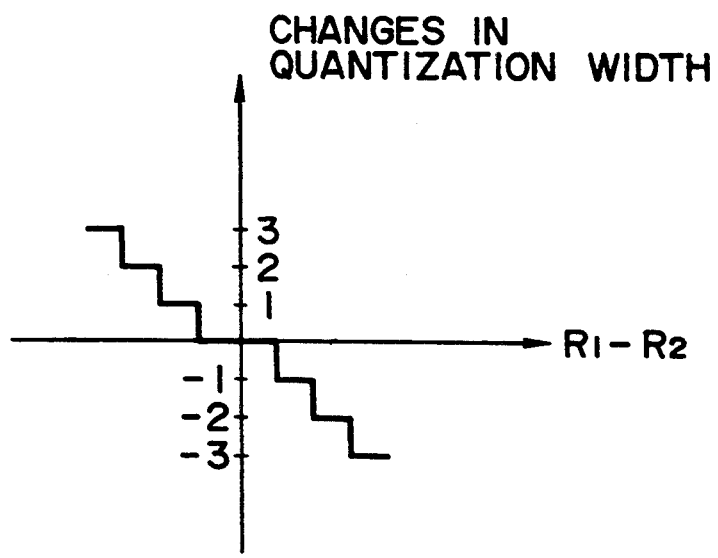
FIG. 10 is a diagram explanatory of a reference quantization table possessed by the quantization circuit 4.
FIG. 11 is a diagram explanatory of input/output characteristics of the variance determining circuit 43 in FIG. 8.

As shown in FIG. 10, the value of the reference quantization table corresponding to the pixel at the top left-hand corner corresponding to the DC component of the DCT coefficient is smallest, while values of the AC component are greater the more rightward and the more downward they come. Since the DCT coefficient of 8×8 pixels is divided by the product of each corresponding value of the reference quantization table and the quantization width, the component whose frequency is lower is assigned greater bits and the component whose frequency is high is assigned smaller bits.

The data thus quantized by the quantization circuit 4 is input to the VLC circuit 5 and, therein, zigzag scanned in units of 8×8 pixels and converted to the variable length code. This variable length code is supplied to the video multiplex coder 6.

The motion vector output from the motion compensated interframe prediction circuit 2 is also converted to a variable length code by the VLC circuit 7 and supplied to the video multiplex coder 6. The video multiplex coder 6 multiplexes outputs of the VLC circuit 5 and the VLC circuit 7 and outputs the multiplexed data to the buffer 8. Thus the buffer 8 is supplied with data quantized with the quantization width corresponding to the initial value set up by the initial value setting circuit 44.

At this time, the buffer 8 detects the actual transmission rate $R_2$ of the data supplied from the video multiplex coder 6 and outputs the same to the averaging circuit 41 and the comparison circuit 46 of the compression ratio control circuit 11. The averaging circuit 41 averages the transmission rate $R_2$ for the period of the reset pulse supplied from the average transmission rate calculation circuit 12 and outputs the average value to the subtractor 42. The subtractor 42 subtracts the average value of the transmission rate $R_2$ supplied from the averaging circuit 41 from the average transmission rate $R_1$ supplied from the average transmission rate calculation circuit 12 and outputs the difference to the variance determination circuit 43.

The variance determination circuit 43 determines the variance of the quantization width corresponding to the output of the subtractor 42. For example, since the output of the subtractor 42 takes on a negative value when the transmission rate $R_2$ is larger than the average transmission rate $R_1$, the value of the quantization width is varied in its increasing direction as shown in FIG. 11 so that the transmission rate $R_2$ is changed in its decreasing direction.

The quantization width control circuit 45 changes the initial value supplied from the initial value setting circuit 44 in accordance with the variance supplied from the variance determination circuit 43. The quantization width thus changed is supplied to the quantization circuit 4 and the VLC circuit 5.

When the period T for averaging the transmission rate $R_2$ in the averaging circuit 41 is set to a long time (for example to several minutes), it meets the requirements if the average rate of the transmission rate $R_2$ nears the average transmission rate $R_1$ during that period of time T. Hence, in such a case where an image having a large quantity of information arrives after images of small quantities of information have lasted, variable length coding corresponding to the information quantity is performed within the period of time T.

On the contrary, when the period T for averaging the transmission rate $R_2$ is shortened, the transmission rate $R_2$ nears the fixed rate of the average transmission rate $R_1$ irrespective of the information quantity of the input image.

The comparison circuit 46, when the transmission rate $R_2$ becomes equal to the maximum transmission rate corresponding to the write speed on the disk 15, outputs its detected signal to the quantization width control circuit 45. At this time, the quantization width control circuit 45 controls the quantization width such that the transmission rate $R_2$ does not exceed the maximum transmission rate.

Figure 12:
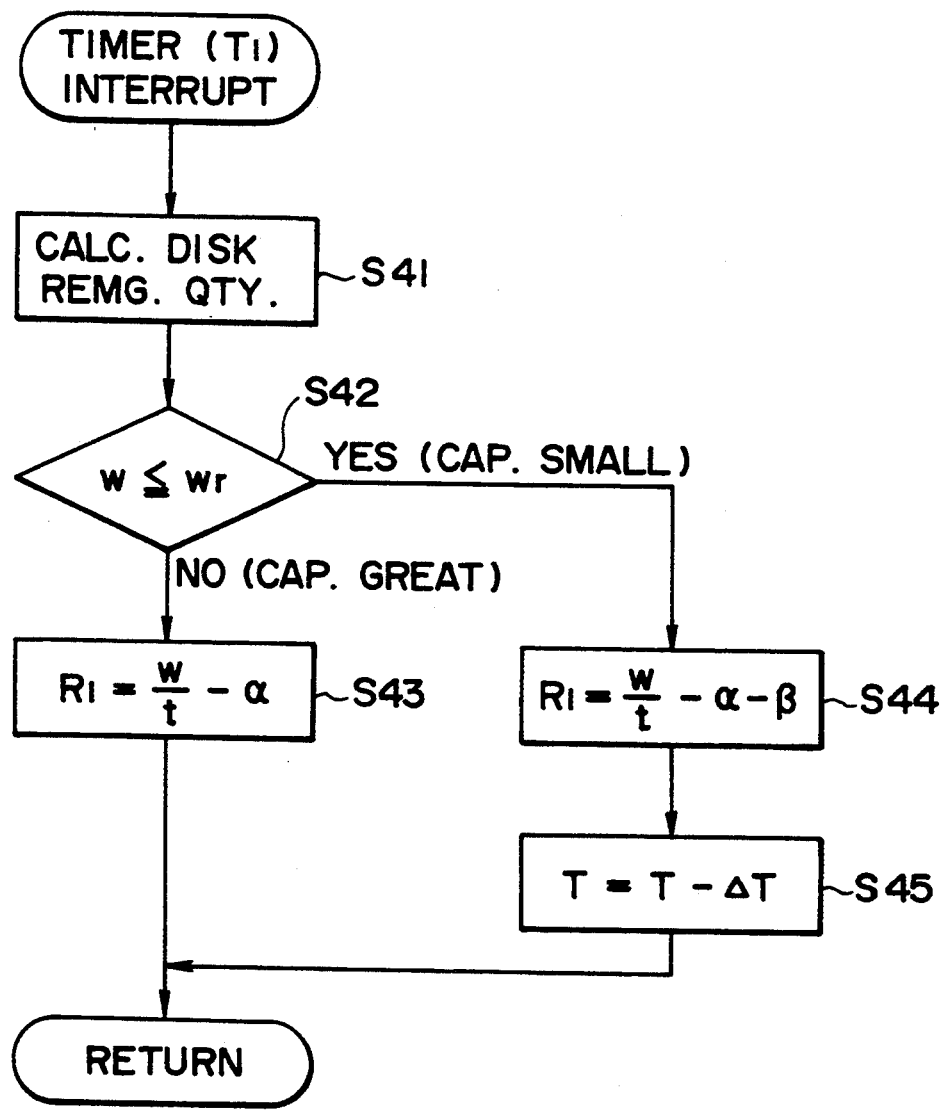
FIG. 12 is a flow chart explanatory of a further example of operations in the average transmission rate calculation circuit 12 in FIG. 1.

Referring now to a flow chart of FIG. 12, a method in which the accuracy in the just recording is improved will be described. In this case, the process shown in FIG. 12 is performed at intervals of a predetermined period T1 (for example several minutes) by timer interrupt. More specifically, first in step S41, the remaining quantity of the disk at this point of time is calculated. Then, in the following step S42, it is decided whether or not the capacity w at this point of time has become smaller than a predetermined reference value (for example $w_r$). When the capacity w is greater than the reference value (when the capacity w is still sufficiently great), then, in the following step S43, the calculation in the average transmission rate calculation circuit 12 is performed the same as in the above described step S4 in FIG. 3 or step S16 in FIG. 7 according to the following expression:

$$R_1 = w/t - \alpha$$

On the contrary, when the capacity w has become equal to or smaller than the reference value $w_r$ (when the remaining quantity becomes small), then, in the following step S44, the average transmission rate $R_1$ is calculated from $$R_1 = w/t - \alpha - \beta.$$

Namely, the average transmission rate $R_1$ is calculated in step S44 so as to become smaller than in step S43. Thereby, the remaining data can be stored in the capacity w more accurately.

Then, in the following step S45, the period T for averaging the transmission rate $R_2$ in the averaging circuit 41 of the compression ratio control circuit 11 is made shorter by calculating it in accordance with $$T = T - \Delta T.$$

Then, with this and the process in step S44 in cooperation, the remaining data can more accurately be recorded in the capacity w neither excessively nor deficiently.

The data input to the buffer 8 as described above are of variable rate, and therefore, the rate changes with time. Accordingly, if the data are continuously read in a certain fixed rate from the buffer 8 and recorded on a disk 15, there is a possibility that the buffer 8 overflows or underflows. Hence data are read from the buffer 8 intermittently.

Figure 13:
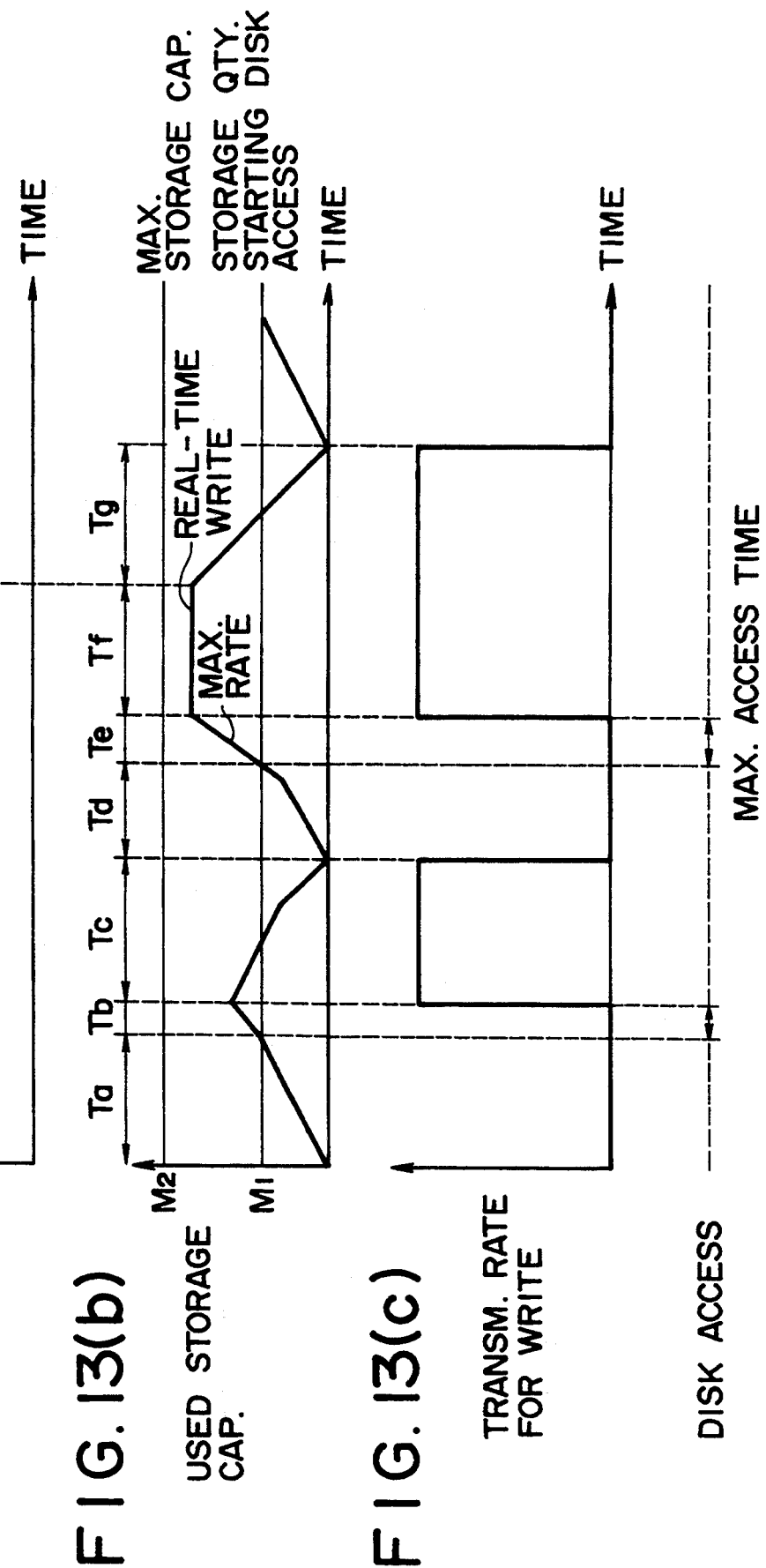
FIGS. 13(a), 13(b) and (13c) are timing charts explanatory of write operation on the disk 15 in FIG. 1.

More specifically, the transmission rate $R_2$ of the data supplied from the video multiplex coder 6 to the buffer 8 changes at preset timing as shown in FIG. 13(a). Against this, if the reading of the data from the buffer 8 is performed at a constant transmission rate but intermittently as shown in FIG. 13(c), the stored quantity in the buffer 8 varies with time as shown in FIG. 13(b).

More specifically, during the period Ta, data are written in the buffer 8. When the written quantity reaches a preset storage quantity $M_1$, data is started to be read from the buffer 8 and written on the disk 15. To do so, the head (not shown) is moved to a predetermined track position in the period Tb following the period Ta, and when the head reaches the predetermined track position, the actual reading of the data from the buffer 8 is performed during the period Tc.

The read data are input to the system multiplex coder 9 and multiplexed therein with the audio data and other additional data and then supplied to the record encoding circuit 10 to be turned into a record code. The record code is supplied to the disk 15 and recorded thereon. The transmission rate for writing is set to be sufficiently higher than the transmission rate $R_2$ and to be constant (FIG. 13(c)).

As shown in the period Tc, the stored quantity of data in the buffer 8 gradually decreases as the writing is continued and finally it becomes zero. At this point of time, the reading (writing on the disk 15) is suspended and the head is brought to a still state. Operations similar to the above are repeated thereafter.

In order to enable the head to start writing at a specific position, to stay in a standby state at a specific position, and start the writing from the specific position again, the track on the disk 15 is for example wobbled or the disk is provided with addresses on the entire area thereof so that the head can access a specific write position by detecting the address.

The maximum storage quantity $M_2$ of the buffer 8 is determined such that the buffer 8 will not overflow even if data is written in the buffer 8 at the maximum rate during the period, as shown in the period Te, from the start of the access when the storage of data has reached the quantity $M_1$ where the access to the disk is to be started and the finish of it.

The transmission rate for the writing of data on the disk is set to such a value that, when data are written on the disk 15 at this transmission rate, the storage quantity in the buffer 8 will not increase even if data are written in the buffer 8 at the maximum transmission rate $R_2$, as shown in the period Tf.

Figure 14:
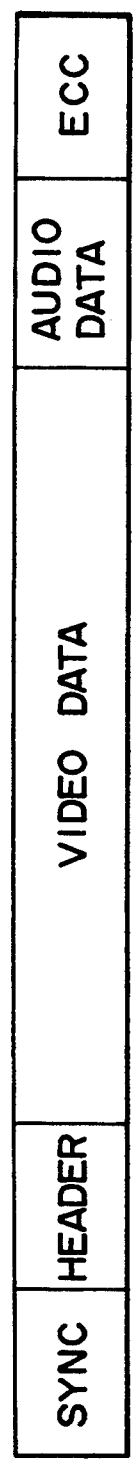
FIG. 14 is a diagram explanatory of a signal format of the disk 15 in FIG. 1.

The writing of data on the disk 15 is performed in units of a packet as shown in FIG. 14. More specifically, in this example, a sync is disposed at the head of the packet and, next to it, a header indicative of the ID of the packet is disposed. Next to it, video data and audio data are disposed in succession, and finally an ECC for error detection and correction is recorded. These sync, header, audio data, and ECC are multiplexed with the video data in the system multiplex coder 9.

The data recorded in the disk 15 as described above are intermittently read and demodulated in the demodulation circuit 21 and supplied to the system multiplex decoder 22. The system multiplex decoder 22 separates the audio signal from the input data and outputs the audio signal to a circuit, not shown. It supplies the video data to the buffer 23 so as to be stored therein. Since the reproduction from the disk 15 is also performed intermittently, the buffer 23 is prevented from overflowing and underflowing.

The data read from the buffer 23 is supplied to the video multiplex decoder 25 and separated therein into the video data component and the motion vector component. The video data component is subjected to an inverse VLC treatment in the inverse VLC circuit 26, subjected to an inverse quantization treatment in the inverse quantization circuit 27, and further subjected to an inverse DCT treatment in the inverse DCT circuit 28. The inverse-DCT-treated data is supplied to the motion compensated interframe prediction circuit 29. Meanwhile, the motion vector, after being subjected to an inverse VLC treatment in the inverse VLC circuit 30, is supplied to the motion compensated interframe prediction circuit 29. The motion compensated interframe prediction circuit 29 compensates the data supplied from the inverse DCT circuit 28 for motion in accordance with the input motion vector and outputs the data to a circuit, not shown.

Figure 15:
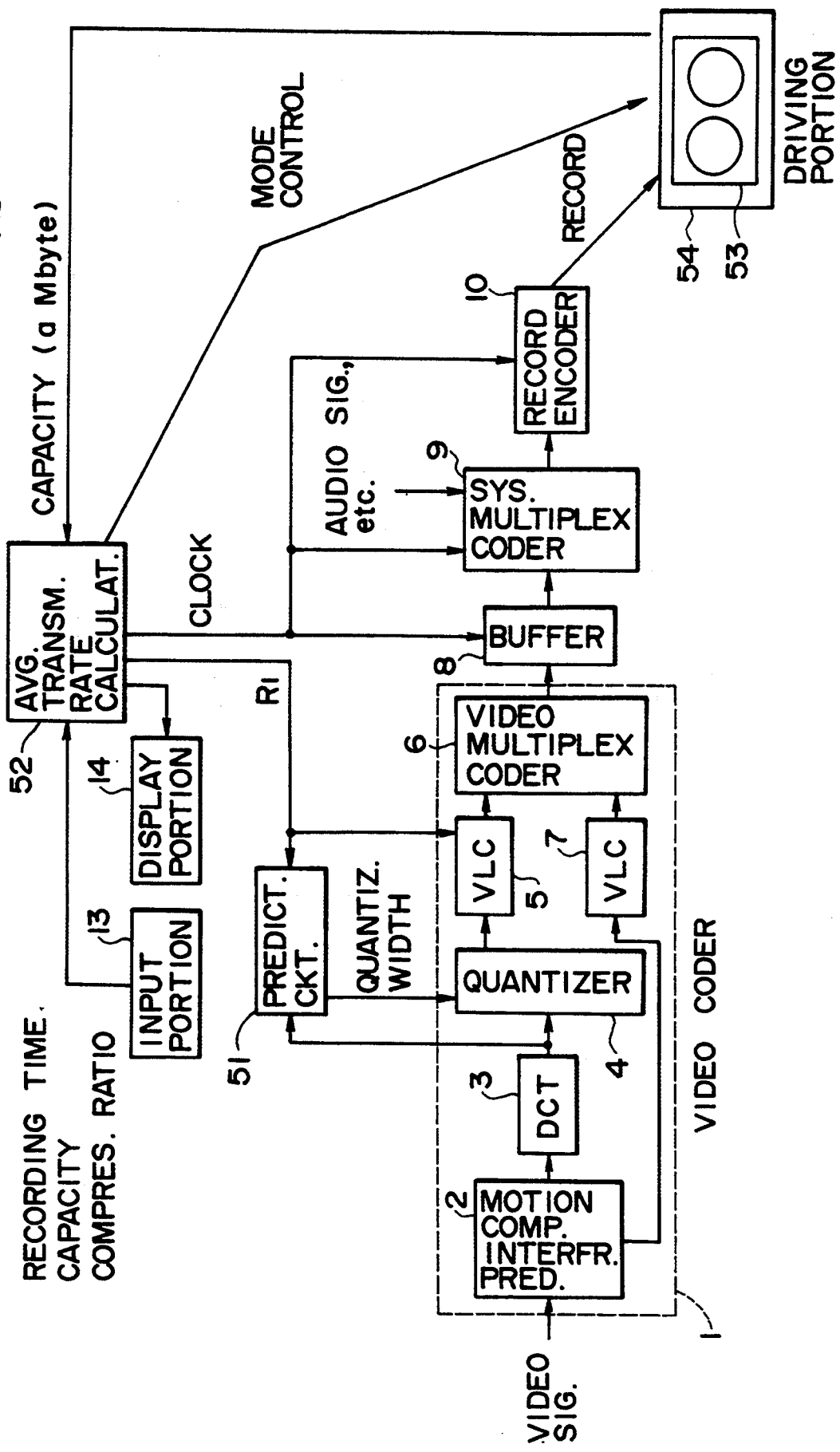
FIG. 15 is a block diagram showing the structure of an embodiment of a digital video tape recorder with the digital data recording apparatus of the present invention applied thereto.

FIG. 15 is a block diagram showing an embodiment of a digital video tape recorder with the digital data recording apparatus of the present invention applied thereto, in which portions corresponding to those in FIG. 1 are denoted by corresponding reference numerals. In this embodiment, there is provided a prediction circuit 51 and it is adapted such that the quantization width is calculated from the output of the DCT circuit 3 and the average transmission rate $R_1$ output from an average transmission rate calculation circuit 52 and output to the quantization circuit 4. Further, the average transmission rate calculation circuit 52 generates a clock and supplies it to the buffer 8, the system multiplex coder 9, and the record encoding circuit 10, and also generates a mode control signal and supplies it to a driving portion 54 for driving a magnetic tape 53. Structure of other portions is the same as that in FIG. 1.

Although there is shown only a recording system in FIG. 15, it is the same as in FIG. 1 that the reproducing system is structured corresponding to the recording system.

Figure 16:
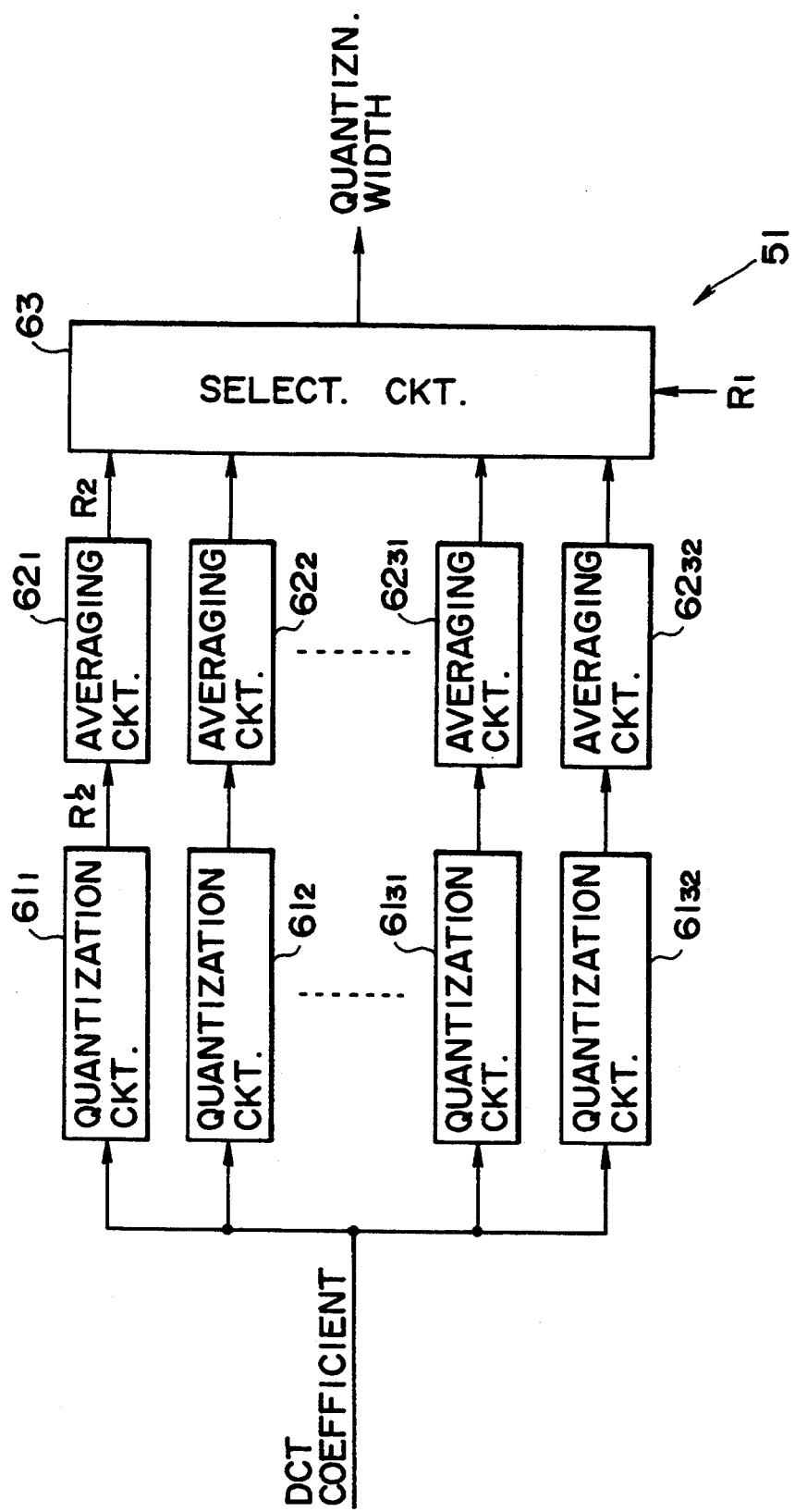
FIG. 16 is a block diagram showing an example of a structure of the prediction circuit 51 in FIG. 15.

The prediction circuit 51 is structured for example as shown in FIG. 16. In this embodiment, the prediction circuit 51 is formed of quantization circuits $61_1$ to $61_{32}$ having preset different 32 quantization widths and receiving the DCT coefficient output from the DCT circuit 3, averaging circuits $62_1$ to $62_{32}$ for averaging the outputs of the respective quantization circuits, and a selection circuit 63 for selecting a value being smaller than the average transmission rate $R_1$ and most close to $R_1$ from the outputs of the averaging circuits $62_1$ to $62_{32}$ and outputting the quantization width corresponding to the selected transmission rate.

Namely, while the quantization width in the quantization circuit 4 was adapted to be controlled by a feedback loop from the buffer 8 in the embodiment of FIG. 1, it is adapted to be controlled by a feed forward loop in this embodiment.

The quantization circuits $61_1$ to $61_{32}$ quantize the DCT coefficient output from the DCT circuit 3 with corresponding quantization widths and output transmission rates $R_2'$ then obtained to the averaging circuits $62_1$ to $62_{32}$ corresponding thereto. The averaging circuits $62_1$ to $62_{32}$ average the transmission rates $R_2'$ input thereto for a predetermined period and output the averaged values as transmission rates $R_2$ to the selection circuit 63.

The selection circuit 63 is supplied with the average transmission rate $R_1$ from the average transmission rate calculation circuit 52. The selection circuit 63, comparing this average transmission rate $R_1$ and the transmission rates $R_2$ output from the averaging circuits $62_1$ to $62_{32}$, selects the transmission rate $R_2$ which is smaller than and most close to the average transmission rate $R_1$, and selects the quantization width corresponding to the selected transmission rate $R_2$. This quantization width is supplied to the quantization circuit 4 and quantization is performed therein.

The thus quantized data are supplied to the buffer 8 the same as in the above described case and stored therein.

Meanwhile, the average transmission rate calculation circuit 52, the same as in the examples shown in FIG. 3 and FIG. 7, calculates the average transmission rate $R_1$ and also generates a clock at a frequency corresponding to the average transmission rate $R_1$. It outputs this clock to the buffer 8, the system multiplex coder 9, and the record encoding circuit 10. These circuits performs their operations in synchronism with this clock. As a result, the data stored in the buffer 8 are read continuously and at a constant transmission rate operating at the clock of the constant frequency. The read data are multiplexed in the system multiplex coder 9 with audio data, ECC data, etc., and recorded on the magnetic tape 53 through the record encoding circuit 10. The format of the signal recorded at this time can be arranged in the packet structure as shown in FIG. 14 the same as in the embodiment of FIG. 1.

In the case of video tape recorder, when recording and reproduction is performed having the clock changed while having the parameters in the recording and reproducing system (such as the tape speed and the drum rotating speed) not changed, it is difficult to greatly change the clock frequency because, then, the recording wavelength correspondingly changes. Hence, it becomes necessary to control the system so that the track pitch and the recording wavelength are kept constant to a certain degree. Therefore, the average transmission rate calculation circuit 52 generates the mode control signal corresponding to the average transmission rate $R_1$ and supplies it to the driving portion 54.

Figure 17:
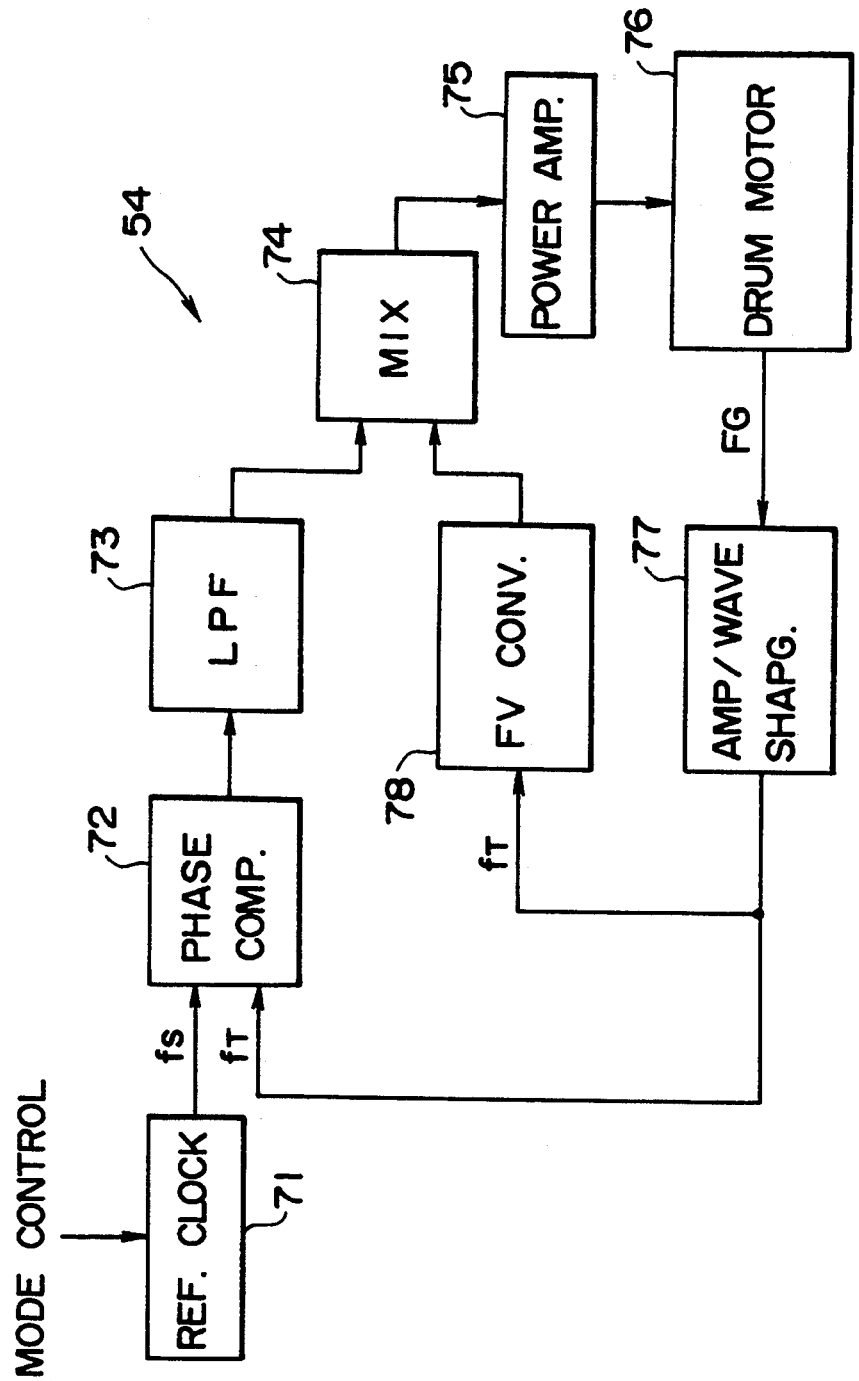
FIG. 17 is a block diagram showing an example of a structure of the driving portion 54 in FIG. 15.

The driving portion 54 is structured for example as shown in FIG. 17. In this example, the reference clock frequency $f_S$ output from a reference clock generation circuit 71 is adapted to be changed in accordance with the mode control signal output from the average transmission rate calculation circuit 52.

The reference clock is supplied to a phase comparison circuit 72 to be compared for phase with a signal $f_T$, which is obtained by amplifying and wave shaping an FG signal output from a drum motor 76 by an amplifying and wave shaping circuit 77. The output of the phase comparison circuit 72 is supplied to a mixing circuit 74 through a low-pass filter 73. The mixing circuit 74 is also supplied with a voltage converted from the output $f_T$ of the amplifying and wave shaping circuit 77 by an FV converting circuit 78. The output of the mixing circuit 74 is power-amplified by a power amplifier circuit 75 and supplied to the drum motor 76.

More specifically, the drum motor 76 outputs the FG signal corresponding to its rotation. The FG signal is both amplified and wave-shaped by the amplifying and wave shaping circuit 77 and supplied as the signal $f_T$ to the phase comparison circuit 72. The phase comparison circuit 72 compares the signal $f_T$ and the reference clock $f_S$ output from the reference clock generation circuit 71 for phase and outputs a phase error signal. The phase error signal is passed through the low-pass filter 73 so as to be deprived of unnecessary high-frequency components and supplied to the power amplifier circuit 75 through the mixing circuit 74. The power amplifying circuit 75 power-amplifies the input signal and drives the drum motor 76 therewith. The so-called phase servo is performed through the above described loop.

Meanwhile, the output $f_T$ of the amplifying and wave shaping circuit 77 is converted by the FV converting circuit 78 into a voltage corresponding to the frequency and supplied to the mixing circuit 74. Also this component is supplied from the mixing circuit 74 to the drum motor 76 through the power amplifier circuit 75. Thus, the so-called frequency servo is performed through this loop.

When the frequency $f_S$ of the reference clock generated by the reference clock generating circuit 71 is for example multiplied by n, the rotating speed of the drum motor 76 is increased n times.

Although it is not shown in FIG. 17, since the capstan motor is controlled in the same manner, the tape speed is increased n times when the frequency $f_S$ of the reference clock is multiplied by n.

Thus, the data corresponding to the average transmission rate $R_1$ is continuously recorded on the magnetic tape 53 at a constant rate.

According to the present invention as described above, since it is arranged such that the ratio of compression of data is controlled in accordance with the capacity of the recording medium in which information can be recorded and the length of information to be recorded, the information of that length can be recorded neither excessively nor deficiently on a recording medium with highest possible quality.

What is claimed is:

1. Apparatus for recording digital data, comprising:
  compression means for compressing digital data in accordance with a compression ratio to produce compressed digital data;
  means for calculating an average transmission rate at which said compressed digital data is to be transmitted for recording on a recording medium, said average transmission rate being calculated in accordance with a quantity of information of said digital data and a remaining recording capacity of said recording medium;
  control means for controlling the compression ratio of said compression means in accordance with said average transmission rate; and
  recording means for recording said compressed digital data on said recording medium.

2. The apparatus according to claim 1, wherein said recording means continuously records said compressed digital data on said recording medium at a constant average transmission rate.

3. Apparatus for recording digital data, comprising:
  means for calculating an average transmission rate at which digital data is to be transmitted for recording in accordance with a recording time of information to be recorded and a remaining recording capacity of a recording medium on which said information is to be recorded;
  compression means for compressing said digital data by quantizing said digital data in accordance with a controllable quantization width to provide compressed digital data;
  control means for controlling a data compression ratio of said compression means by varying the quantization width of said compression means in accordance with said average transmission rate; and
  recording means for recording said compressed digital data on said recording medium.

4. The apparatus according to claim 3, wherein said compression means includes orthogonal transform means for orthogonal-transforming said digital data to provide orthogonal-transformed digital data; and said orthogonal-transformed digital data is compressed by quantizing said orthogonal-transformed digital data.

5. The recording apparatus according to claim 4, wherein said orthogonal transform means is a discrete cosine transformer.

6. Method of recording digital data, comprising the steps of:
  compressing digital data in accordance with a compression ratio to produce compressed digital data;
  calculating an average transmission rate at which said compressed digital data is to be transmitted for recording on a recording medium, said average transmission rate being calculated in accordance with a quantity of information of said digital data and a remaining recording capacity of said recording medium;
  controlling the compression ratio in said compressing step in accordance with said average transmission rate; and
  recording said compressed digital data on said recording medium.

* * * * *